US010370026B2

(12) United States Patent
Kim

(10) Patent No.: US 10,370,026 B2
(45) Date of Patent: Aug. 6, 2019

(54) METHOD AND APPARATUS FOR CONTROLLING MOTOR DRIVEN POWER STEERING SYSTEM

(71) Applicant: Hyundai Mobis Co., Ltd., Seoul (KR)

(72) Inventor: Do Young Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 395 days.

(21) Appl. No.: 15/291,430

(22) Filed: Oct. 12, 2016

(65) Prior Publication Data

US 2017/0101126 A1 Apr. 13, 2017

(30) Foreign Application Priority Data

Oct. 12, 2015 (KR) .................. 10-2015-0141932

(51) Int. Cl.
| | | |
|---|---|---|
| *B62D 5/04* | (2006.01) | |
| *B62D 6/02* | (2006.01) | |
| *B62D 6/10* | (2006.01) | |
| *B62D 15/02* | (2006.01) | |

(52) U.S. Cl.
CPC .......... *B62D 5/0463* (2013.01); *B62D 5/049* (2013.01); *B62D 5/0469* (2013.01); *B62D 5/0493* (2013.01); *B62D 6/02* (2013.01); *B62D 6/10* (2013.01); *B62D 15/0245* (2013.01)

(58) Field of Classification Search
CPC ............................ B62D 5/0463; B62D 5/0469; B62D 15/0245; B62D 5/049; B62D 6/02; B62D 5/0493; B62D 6/10
See application file for complete search history.

(56) References Cited

U.S. PATENT DOCUMENTS

| | | | | |
|---|---|---|---|---|
| 2003/0141835 A1* | 7/2003 | Zheng | ................. | B62D 5/0463 318/434 |
| 2006/0247838 A1* | 11/2006 | Bauer | ................ | B60T 8/17551 701/41 |
| 2008/0119986 A1* | 5/2008 | Wei | .................... | B62D 15/0245 701/41 |
| 2013/0304327 A1* | 11/2013 | Morishita | ........... | B62D 5/0463 701/43 |
| 2017/0088166 A1* | 3/2017 | Kunihiro | .............. | B62D 5/0463 |
| 2017/0282972 A1* | 10/2017 | Moretti | ............. | B62D 15/0265 |
| 2018/0093702 A1* | 4/2018 | Nampei | ................... | H02P 6/16 |

FOREIGN PATENT DOCUMENTS

KR   10-0247334   4/2000

* cited by examiner

*Primary Examiner* — Thomas Ingram

(74) *Attorney, Agent, or Firm* — H.C. Park & Associates, PLC

(57) ABSTRACT

A method for controlling a motor driven steering system includes setting a reference point of a motor angle by a control unit, estimating a steering angular speed and a steering angle using the reference point by the control unit, determining whether the steering angle is included within a predetermined setting range by the control unit, and controlling an output torque of the motor driven steering system by the control unit using the steering angular speed and the steering angle, when the steering angle is included within the setting range.

14 Claims, 3 Drawing Sheets

METHOD AND APPARATUS FOR CONTROLLING MOTOR DRIVEN POWER STEERING SYSTEM

CROSS-REFERENCE TO RELATED APPLICATION

This application claims priority from and the benefit of Korean Patent Application No. 10-2015-0141932, filed on Oct. 12, 2015, which is hereby incorporated by reference for all purposes as if fully set forth herein.

BACKGROUND

Field

Exemplary embodiments of the present invention relate to a method and apparatus for controlling a motor driven power steering system, and more particularly, to a method and apparatus for controlling a motor driven power steering system, which reduces the amount of impact due to collision between a stopper of a rack-bar and an inner ball joint (IBJ) socket (housing) of a gear box.

Discussion of the Background

A hydraulic power steering system that forms a hydraulic pressure in a hydraulic pump and assists the assistive steering force, and a motor driven power steering system (hereinafter, referred to as "MDPS") assisting the assistive steering force using a driving torque of an electric motor have been used as an auxiliary power steering system for reducing the assistive steering force of a driver at the time of steering a vehicle.

The MDPS provides an improved steering performance and sense of steering compared to the hydraulic power steering system because the electric motor of the MDPS is automatically controlled according to a running condition of the vehicle and the MDPS performs a function to assist the assistive steering force according to a driver's steering wheel operation.

However, in case of an MDPS of the related art, when a driver performs a steering operation in a full turn to the left or right maximum value, a stopper of the rack-bar linked to a steering shaft, and an IBJ socket (housing) of a gear box may be in contact with each other. This contact may cause noise and vibration of the vehicle itself, give an unpleasant feeling to the driver, and shorten the life span of the vehicle due to the mechanical damage.

The related art of the present invention is disclosed in Korean Patent Registration No. 10-0247334 registered on Dec. 10, 1999 and entitled "Electric power-assisted steering".

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention are directed to a method and apparatus for controlling a motor driven power steering system, which release the impact caused by collision between a stopper of a rack-bar and an IBJ socket (housing) of a gear box when a driver operates the steering wheel in a full turn, and thereby reducing noise due to the impact and preventing a mechanical damage of components.

An exemplary embodiment of the present invention discloses a method for controlling a motor driven steering system, including: setting, by a control unit, a reference point of a motor angle; estimating, by the control unit, a steering angular speed and a steering angle using the reference point; determining, by the control unit, whether the steering angle is included within the predetermined setting range; and controlling, by the control unit, an output torque of the motor driven steering system using the steering angular speed and the steering angle, when the steering angle is within the setting range.

Operation of setting a reference point of a motor angle may include determining whether a steering angle sensor is failed or not after an ignition of a vehicle is on, and setting the reference point of the motor angle using one of a steering angle inputted from the steering angle sensor and a steering angle stored when the ignition of the vehicle is off, according to a result of determining whether the steering angle sensor is failed or not.

In setting the reference point of the motor angle, as a result of determining whether the steering angle sensor is failed or not, if the steering angle sensor is in a normal state, the reference point of the motor angle is set to an angle corresponding to the steering angle inputted from the steering angle sensor.

In setting the reference point of the motor angle, as a result of determining whether the steering angle sensor is failed or not, if the steering angle sensor is in a fail state, the reference point of the motor angle is set using the steering angle stored when the ignition of the vehicle is off.

Operation of setting a reference point of a motor angle may include determining whether the vehicle is in a straight-running state, setting the current steering angle to 0 if the vehicle is determined to be in the straight-running state, determining whether an error between the current steering angle and the steering angle stored when the ignition of the vehicle is off is equal to or greater than a setting error, setting the reference point of the motor angle on the basis of the current steering angle if the error of the steering angle is determined to be equal to or greater than the setting error, and setting the reference point of the motor angle on the basis of the steering angle stored when the ignition of the vehicle is off if the error of the steering angle is determined to be less than the setting error.

In controlling the output torque of the motor driven steering system, the output torque decreases as the steering angle increases.

Operation of controlling an output torque of the motor driven steering system may include detecting a predetermined current decouple gain corresponding to the steering angular speed and the steering angle, and compensating the output torque of the motor driven steering system by reflecting the current decouple gain to the output torque of the motor driven steering system.

Operation of controlling an output torque of the motor driven steering system may further include detecting a predetermined vehicle speed gain corresponding to a speed of the vehicle, and compensating the output torque of the motor driven steering system by reflecting the vehicle speed gain to the output torque of the motor driven steering system.

An exemplary embodiment of the present invention also discloses an apparatus for controlling a motor driven power steering system, including: a steering angle sensor for detecting a steering angle of a steering wheel; and a control unit for setting a reference point of a motor angle on the basis of the steering angle, estimating a steering angular speed and a steering angle using the reference point, and controlling an output torque of the motor driven steering system using the estimated steering angular speed and steering angle if the estimated steering angle is included within the predetermined setting range.

In setting the reference point of the motor angle, the control unit determines whether the steering angle sensor is failed or not after an ignition of a vehicle is on, and sets the reference point of the motor angle using one of a steering angle inputted from the steering angle sensor and a steering angle stored when the ignition of the vehicle is off, according to a result of determining whether the steering angle sensor is failed or not.

In setting the reference point of the motor angle, if the steering angle sensor is in a normal state, the control unit sets the reference point of the motor angle in response to the steering angle inputted from the steering angle sensor, and if the steering angle sensor is in a fail state, the control unit sets the reference point of the motor angle using the steering angle stored when the ignition of the vehicle is off.

In setting the reference point of the motor angle, if the vehicle is in the straight-running state, the control unit sets the current steering angle to 0, and the control unit determines whether an error between the current steering angle and the steering angle stored when the ignition of the vehicle is off is equal to or greater than a setting error, sets the reference point of the motor angle on the basis of the current steering angle if the error of the steering angle is determined to be equal to or greater than a setting error, and sets the reference point of the motor angle on the basis of the steering angle stored when the ignition of the vehicle is off if the error of the steering angle is determined to be less than the setting error.

In controlling the output torque of the motor driven steering system, the control unit detects a predetermined current decouple gain corresponding to the steering angular speed and the steering angle, and compensates the output torque of the motor driven steering system by reflecting the current decouple gain to the output torque of the motor driven steering system.

In controlling the output torque of the motor driven steering system, the control unit detects a predetermined vehicle speed gain corresponding to the speed of the vehicle, and compensates the output torque of the motor driven steering system by reflecting the vehicle speed gain to the output torque of the motor driven steering system.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
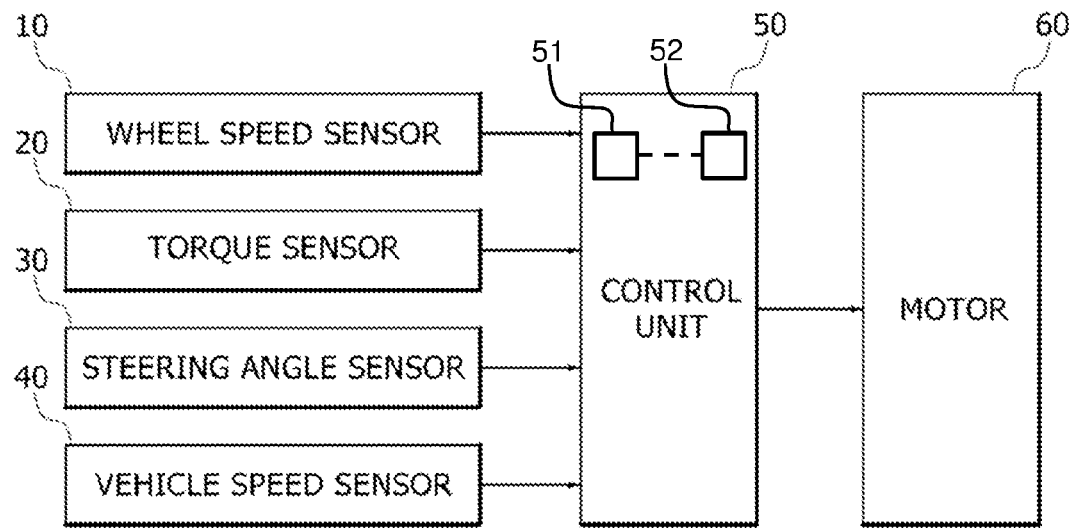
FIG. 1 is a block diagram illustrating a configuration of an apparatus for controlling a motor driven power steering system according to an exemplary embodiment of the present invention.

Hereinafter, exemplary embodiments of the present invention will be described in detail with reference to the accompanying drawings. Throughout the specification, like reference numerals denote like elements having the same or similar functions. Detailed description of components or functions apparent to those skilled in the art will be omitted for clarity. It should be understood that the following exemplary embodiments are provided by way of example and that the present invention is not limited to the exemplary embodiments disclosed herein and can be implemented in different forms by those skilled in the art.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a block diagram illustrating a configuration of an apparatus for controlling a motor driven power steering system according to an exemplary embodiment of the present invention.

Referring to FIG. 1, the apparatus for controlling a motor driven power steering system according to an exemplary embodiment of the present invention includes a wheel speed sensor 10, a torque sensor 20, a steering angle sensor 30, a vehicle speed sensor 40, a control unit 50, and a motor 60. The control unit 50 may include a processor 51 coupled to memory 52. The processor 51 may execute operations stored in memory 52 based on information received from memory 52, the wheel speed sensor 10, the torque sensor 20, the steering angle sensor 30, the vehicle speed sensor 40, and the motor 60.

In the exemplary embodiment, the motor driven power steering system (MDPS) assisting the assistive steering force using a driving torque of the motor 60 may be employed as the motor driven power steering system. The MDPS of the exemplary embodiment may be applied to a column driving mode MDPS (C-MDPS) in which the motor 60 is combined with a steering shaft (not illustrated), a pinion driving mode MDPS (P-MDPS) in which the motor 60 may be combined with a pinion gear of a handle shaft (not illustrated), and a rack driving mode MDPS (R-MDPS) in which the motor 60 is combined with a rack gear (not illustrated), and so on.

For reference, a rack driving mode MDPS (R-MDPS) will be described as an example in the exemplary embodiment.

Generally, the rack driving mode is a driving mode to receive a driving torque by the motor 60 and to implement a shaft direction movement of a rack-bar (not illustrated). The rotation force of the motor 60 is transferred to the rack-bar and converted into a straight movement force of a shaft direction of the rack-bar. To this end, a belt, a pulley, ball nuts, bearings, a ball screw type rack-bar, or the like are used. In other words, the ball nuts are combined with the rack-bar in a state rotatably supported by the bearing inside a decelerator, a driving pulley is fixed to a driving shaft of the motor 60, and a driven pulley is fixed to the ball nut combined with the rack-bar to transfer the rotation force. The driving pulley of the motor 60 side and the driven pulley of the ball nut side are connected to each other by the belt, and the rotation force of the motor 60 is transferred to the rack-bar through the pulley and belt. At this time, the rotation force of the motor 60 is converted into the straight movement force of the rack-bar by a ball screw structure of the ball nut and rack-bar.

A wheel speed sensor 10 are is installed in a front right wheel (FR) and a front left wheel (FL) of the vehicle, respectively. Both wheel speed sensors 10 sense the wheel speed of each of the front right wheel (FR) and front left wheel (FL), and input the corresponding sensed wheel speed to the control unit 50.

The torque sensor 20 detects a steering torque of a steering wheel (not illustrated) and inputs the detected steering torque to the control unit 50.

The steering angle sensor 30 detects a steering angle of the steering wheel and inputs the detected steering angle to the control unit 50. Here, the steering angle sensor 30 is a separate steering angle sensor that is separately included from the MDPS. The steering angle sensed by the separate steering angle sensor 30 may be used one time when the ignition is on.

The vehicle speed sensor 40 senses a speed of the vehicle and inputs the sensed speed of the vehicle to the control unit 50.

The control unit 50 calculates an output torque using the steering angle, the steering torque, the speed of the vehicle, and the wheel speed, and applies a current corresponding to the output torque to the motor 60 to assist the driver's assistive steering force.

In this case, when the driver fully turns the steering wheel, if the steering angle enters a preset setting range, the control unit 50 reduces the output torque and limits the current applied to the motor 60, and thereby minimizing the impact.

Here, the setting range means a range of a steering angle just before collision between a stopper of the rack-bar and an IBJ socket (housing) occurs. Accordingly, if the steering angle is included within the setting range, the control unit 50 reduces the impact due to collision between the stopper of the rack-bar and the IBJ socket (housing), reduces noise due to the impact, and prevents a mechanical damage of components by limiting the output torque.

More specifically describing, when an ignition of the vehicle is on, the control unit 50 determines whether the steering sensor 30 is in a fail state or not, and if the steering sensor 30 is in a normal state, the control unit 50 receives a steering angle from the steering sensor 30, and corrects an offset of a motor angle, that is, sets a reference point of the motor angle on the basis of the received steering angle.

Subsequently, the control unit 50 estimates a steering angular speed and steering angle in consideration of a mechanical specifications, such as the above-described motor angle (or reference value of the motor angle), the decelerator, a rack-bar C-factor, or the like. Here, the steering angle inputted from the steering angle sensor 30 may be used one time when the ignition is on, and the estimated steering angle may correspond to a rack position. The steering angular speed and steering angle may be estimated from a condition according to mechanical specifications, such as the motor angle (or the reference value of the motor angle), the decelerator, the rack-bar C-factor, or the like by a control logic that is preset in the vehicle, but it is not limited thereto, may be estimated by various known or unknown methods. Hereinafter, the estimated steering angular speed and steering angle will be used.

Meanwhile, after estimating the steering angular speed and steering angle as described-above, the control unit 50 determines whether the estimated steering angle is included within the preset setting range. As a result of determination, the steering angle is included within the preset setting range, the control unit 50 controls the output torque of the motor driven power steering system using the steering angular speed, steering angle, and speed of the vehicle.

In other words, the control unit 50 calculates the output torque using the steering angular speed, steering angle, and speed of the vehicle and outputs the calculated output torque. At this time, the control unit 50 detects a preset current decouple gain corresponding to the steering angular speed and steering angle, detects a preset vehicle speed gain corresponding the speed of the vehicle, and compensates the output torque of the motor driven power steering system by multiplying the output torque of the motor driven power steering system with the current decouple gain and the vehicle speed gain.

In this case, the control unit 50 detects the current decouple gain through a two-dimensional look-up table by the steering angle and steering angular speed. If the current decouple gain is reduced, the output of the motor 60, that is, the driving torque is reduced, therefore, the impact due to collision of the stopper of the rack-bar and the IBJ socket (housing) of the gear box can be reduced.

In addition, the control unit 50 detects the preset vehicle speed gain corresponding to the vehicle speed. The vehicle speed gain allows the output torque to be increased when the vehicle speed is increased. Accordingly, as the vehicle speed increases, a rack end stop (RES) function is released. The RES function is a function to minimize the impact, in a state that the vehicle including the MDPS is stopped, when the driver operates the steering wheel in a full turn, by recognizing the full turn condition and limiting a current applied to the motor 60 using a signal of the steering angle sensor 30 from just before the full turn.

Meanwhile, as described-above, in case of compensating the output torque using the current decouple gain and vehicle speed gain, the control unit 50 calculates a current that drives the motor 60 in consideration of the MDPS mechanical specifications, such as a torque constant, a speed reduction ratio, a mechanic efficiency, the rack-bar, the C-factor, or the like, and applies the calculated current to the motor 60.

As a result, the driver's column torque becomes heavy instantaneously, and the impact amount of the rack-bar becomes decreased. In addition, if the driver's column torque is changed according to a road surface load, the output torque may be changed. Therefore, the impact amount can be controlled regardless of the road surface condition.

Meanwhile, in the above-described process, if the steering angle sensor 30 is in a fail state, the control unit 50 detects the steering angle stored when the previous ignition is off, and controls the steering of the vehicle on the basis of the detected steering angle. At this time, the control unit 50 determines whether the vehicle is in a straight-running state, and if the vehicle is in the straight-running state, the control unit 50 sets the current steering angle to 0.

Here, the control unit 50 stores the steering angle at the time of previous ignition off in preparation for failure of the steering angle sensor 30, as described above. The stored steering angle may be used to estimate the steering angle in preparation for failure of the steering angle sensor 30 at the time of ignition on.

In addition, whether the vehicle is in the straight-running state may be determined whether the driving is maintained for two seconds or more, in a state satisfying all of three conditions that a speed of the vehicle is equal to or greater than 60 km/h, a column torque is equal to or less than 0.2 Nm, a difference of a wheel speed of the front left wheel and a wheel speed of the front right wheel is equal to or less than 0.2.

For reference, determination whether the vehicle is in the straight-running state is not limited to the above exemplary embodiment, and may be variously set according to needs.

Meanwhile, if the vehicle in the straight-running state as described above, the control unit 50 sets the current steering angle to 0, determines whether a steering angle error between the current steering angle and the steering angle stored at the time of the ignition off is equal to or greater than the setting error, and sets the reference point of the motor angle according to a result of determination.

In other words, if the steering angle error between the current steering angle and the steering angle stored at the time of the ignition off is equal to or greater than the setting error, the control unit 50 sets the reference point of the motor angle on the basis of the current steering angle, and if the steering angle error is less than the setting error, the control unit 50 sets the reference point of the motor angle on the basis of the steering angle stored at the time of the ignition off of the vehicle.

Here, the case that the steering angle error is less than the setting error corresponds to a case that steering angle error between the steering angle at the time of the ignition off and a real steering angle at the time of the ignition on is within the setting error. In this case, since the steering error is within the setting error, the reference point of the motor angle may be set on the basis of the steering angle at the time of the ignition off.

The case that the steering angle error is equal to or greater than the setting error corresponds to a case that the steering angle error between the steering angle at the time of the ignition off and the real steering angle at the time of the ignition on is out of the setting error, and corresponds to a case that the driver or the like forcibly operates the steering wheel over the setting error in a state of the ignition off. In this case, the real steering angle is greatly changed. Therefore, the reference point of the motor angle is set on the basis of the current steering angle.

As such, after setting the reference point of the motor angle, the control unit 50 estimates the steering angular speed and steering angle as described-above, and compensates the output torque on the basis of the estimated steering angular speed and steering angle.

Hereinafter, a method for controlling a motor driven power steering system according to an exemplary embodiment of the present invention will be described with reference to FIGS. 2 and 3 in detail.

Figure 2:
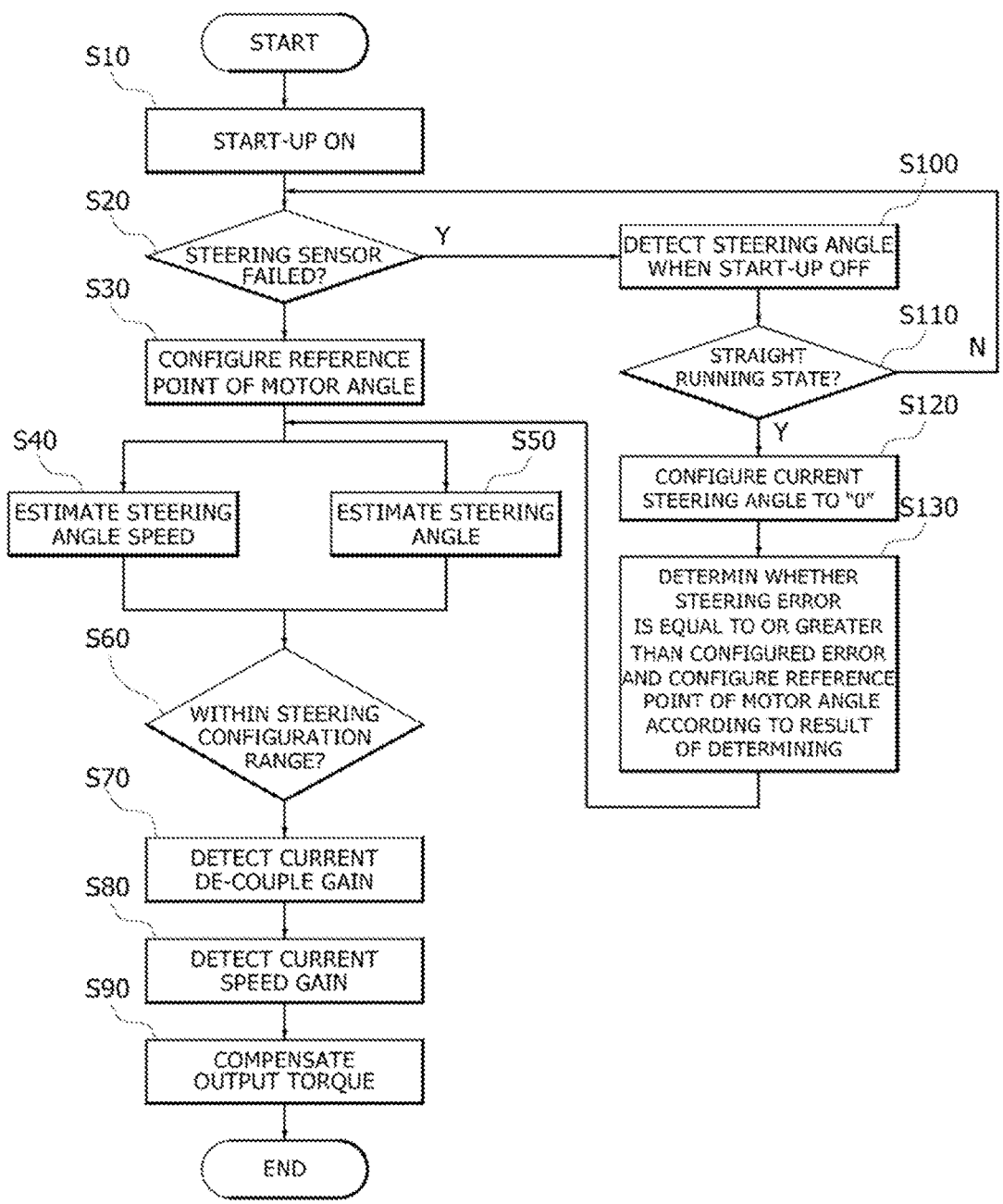
FIG. 2 is a flowchart illustrating a method for controlling a motor driven power steering system according to an exemplary embodiment of the present invention.
Figure 3:
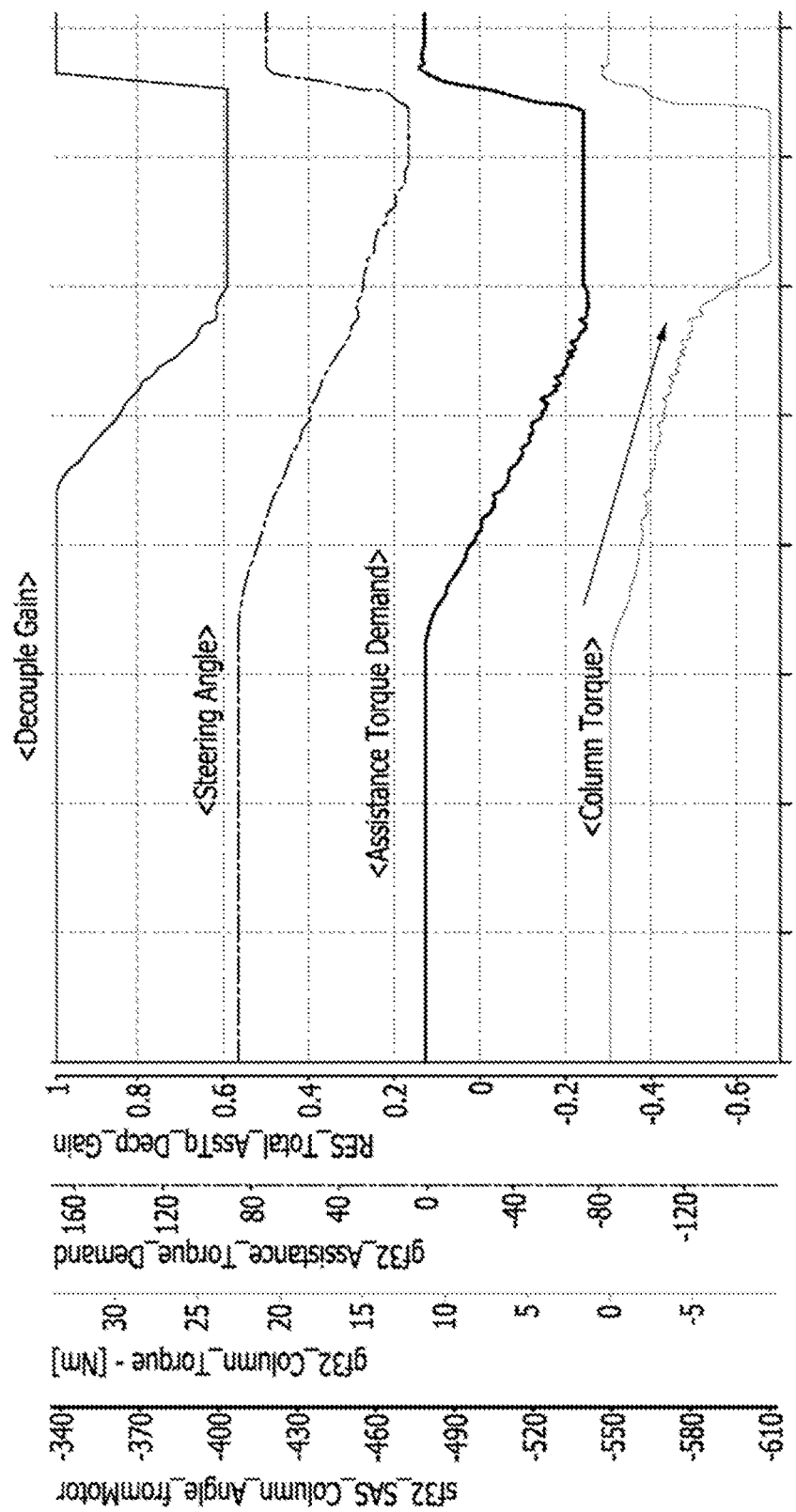
FIG. 3 is a diagram illustrating a variation of an output torque according to an exemplary embodiment of the present invention.

FIG. 2 is a flowchart illustrating a method for controlling a motor driven power steering system according to an exemplary embodiment of the present invention, and FIG. 3 is a diagram illustrating a variation of an output torque according to an exemplary embodiment of the present invention.

Referring to FIG. 2 with FIG. 1, when the ignition is on, the control unit 50 determines whether the steering angle sensor 30 is in a fail state (S20).

As a result of determination in operation S20, if the steering angle sensor 30 is in a normal state, the control unit 50 receives a steering angle from the steering angle sensor 30, and corrects the offset of the motor angle, that is, sets a reference point of the motor angle on the basis of the received steering angle (S30).

Subsequently, the control unit 50 estimates the steering angular speed and steering angle in consideration of the mechanical specifications, such as a motor angle, a decelerator, and a rack bar C-factor (S40, S50).

After estimating the steering angle as described above, the control unit 50 determines whether the steering angle is included within a predetermined setting range (S60).

As a result of determination in operation S60, if the steering angle is included within the setting range, the control unit 50 calculates an output torque using a steering angle, a steering torque, and a speed of the vehicle. In this process, the control unit 50 detects a current decouple gain through a two-dimensional look-up table by a steering angle and steering angular speed (S70), and detects a predetermined vehicle speed gain corresponding to a speed of a vehicle (S80).

Subsequently, the control unit 50 compensates the output torque of the motor driven power steering system by multiplying the output torque with the current decouple gain and vehicle speed gain (S90).

In this case, the control unit 50 detects the current decouple gain through the two-dimensional look-up table by the steering angle and steering angular speed. If the current decouple gain is decreased, the output of the motor 60 is reduced, and the impact due to the collision between the stopper of the rack bar and the IBJ socket (housing) of the gear box can be reduced.

In addition, in case of compensating the output torque using the current decouple gain and vehicle speed gain, the control unit 50 calculates a current that drives the motor 60 in consideration of mechanical specifications of the MDPS, such as a torque constant, a speed reduction ratio, mechanical efficiency, rack bar, C-factor, or the like and applies the calculated current to the motor 60.

Referring to FIG. 3, when the driver operates the steering wheel to the end, that is, when steering the steering wheel from −410 degrees to −460 degrees, the output torque is reduced by the decouple gain (a current decouple gain detected by the steering angle and steering angular speed, and a vehicle speed gain detected according to the speed of the vehicle) that reduces the output torque, the column torque is reduced. Therefore, the driver's column torque becomes heavy instantaneously. This causes reduction of the impact amount of the steering angle rack-bar.

Meanwhile, as a result of determination in operation S20, the steering angle sensor 30 is in a fail state, the control unit 50 detects the steering angle stored at the time of the previous ignition off (S100) and controls the steering of the vehicle on the basis of the detected steering angle.

At this time, the control unit 50 determines whether the speed of the vehicle is equal to or greater than 60 km/h, a column torque is equal to or less than 0.2 Nm, a difference of the wheel speed of the front left wheel and the wheel speed of the front right wheel is equal to or less than 0.2, and whether the driving is maintained for two seconds or more, in a state satisfying all of the three conditions. On the basis of determination, the control unit 50 determines whether the vehicle is in a straight-running state (S110), and if the vehicle is not in the straight-running state, the control unit 50 returns to operation S30.

On the other hand, if the vehicle is in the straight-running state, the control unit 50 sets the current steering angle to 0 (S120), determines whether the steering angle error is equal to or greater than the setting error, and sets the reference point of the motor angle according to a result of determination (S130). At this time, if the steering angle error is equal to or greater than the setting error, the control unit 50 sets the reference point of the motor angle on the basis of the current steering angle, and if the steering angle error is less than the setting error, the control unit 50 sets the reference point of the motor angle on the basis of the steering angle stored at the time of the ignition off of the vehicle.

After setting the reference point of the motor angle, the control unit 50 estimates the steering angular speed and steering angle (S40, S50), and subsequently, determines whether the steering angle is included within the predetermined setting range (S60).

As a result of determination in operation S60, if the steering angle is included within the setting range, the control unit 50 calculates and outputs the output torque, and at the same time, detects the current decouple gain through a two-dimensional look-up table by the steering angle and steering angular speed (S70), detects a predetermined vehicle speed gain corresponding to the speed of the vehicle (S80), and compensates the output torque of the motor driven power steering system by multiplying the output torque with the current decouple gain and vehicle speed gain (S90).

The control unit 50 and/or one or more components thereof (e.g., a processor 51 coupled to memory 52), may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, the control unit 50 and/or one or more components thereof may include or otherwise be associated with one or more memories (e.g., memory 52) including code (e.g., instructions) configured to cause the control unit 50 and/or one or more components thereof to perform one or more of the features, functions, processes, etc., described herein.

The memories (e.g., memory 52) may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire, and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

In the exemplary embodiment, when the driver operates the steering wheel in a full turn, the collision between the stopper of the rack-bar and the IBJ socket (housing) of the gear box is released, and thereby reducing noise due to the impact and preventing mechanical damage of components.

The exemplary embodiments of the inventive concept have been disclosed above for illustrative purposes. Those of ordinary skill in the art will appreciate that various modifications, additions and substitutions are possible, without departing from the scope and spirit of the inventive concept as disclosed in the accompanying claims.

What is claimed is:

1. A method for controlling a motor driven power steering system, comprising:
    setting, by a control unit, a reference point of a motor angle;
    estimating, by the control unit, a steering angular speed and a steering angle using the reference point;
    determining, by the control unit, whether the steering angle is included within a predetermined setting range, the predetermined setting range being set to a range of the steering angle before a collision occurs between a stopper of a rack-bar and an inner ball joint socket of a gear box set; and
    controlling, by the control unit, an output torque of the motor driven steering system using the steering angular speed and the steering angle, upon a determination that the steering angle is included within the setting range.

2. The method of claim 1, wherein setting the reference point of a motor angle comprises:
    determining whether a steering angle sensor is failed or not after an ignition of a vehicle is on, and
    setting the reference point of the motor angle using one of a steering angle inputted from the steering angle sensor and a steering angle stored when the ignition of the vehicle is off, according to a result of determining whether the steering angle sensor is failed or not.

3. The method of claim 2, wherein in setting a reference point of a motor angle, as a result of determining whether the steering angle sensor is failed or not, if the steering angle sensor is in a normal state, the reference point of the motor angle is set to an angle corresponding to the steering angle inputted from the steering angle sensor.

4. The method of claim 2, wherein in setting a reference point of a motor angle, as a result of determining whether the steering angle sensor is failed or not, if the steering angle sensor is in a fail state, the reference point of the motor angle is set using the steering angle stored when the ignition of the vehicle is off.

5. The method of claim 4, wherein setting a reference point of a motor angle comprises:
    determining whether the vehicle is in a straight-running state;
    setting the current steering angle to 0 if the vehicle is determined to be in the straight-running state;
    determining whether an error between the current steering angle and the steering angle stored when the ignition of the vehicle is off is equal to or greater than a setting error, setting the reference point of the motor angle on the basis of the current steering angle if the error of the steering angle is determined to be equal to or greater than the setting error; and setting the reference point of the motor angle on the basis of the steering angle stored when the ignition of the vehicle is off if the error of the steering angle is determined to be less than the setting error.

6. The method of claim 5, wherein controlling an output torque of the motor driven steering system such that the output torque decreases as the steering angle increases.

7. The method of claim 1, wherein controlling an output torque of the motor driven steering system comprises:

detecting a predetermined current decouple gain corresponding to the steering angular speed and the steering angle; and compensating the output torque of the motor driven steering system by reflecting the current decouple gain to the output torque of the motor driven steering system.

8. The method of claim 1, wherein controlling an output torque of the motor driven steering system further comprises:

detecting a predetermined vehicle speed gain corresponding to a speed of a vehicle; and compensating the output torque of the motor driven steering system by reflecting the vehicle speed gain to the output torque of the motor driven steering system.

9. An apparatus for controlling a motor driven power steering system, comprising:

a steering angle sensor configured to detect a steering angle of a steering wheel; and a control unit configured to set a reference point of a motor angle on the basis of the steering angle, estimate a steering angular speed and a steering angle using the reference point, and control an output torque of the motor driven steering system using the estimated steering angular speed and steering angle if the estimated steering angle is included within a predetermined setting range, the predetermined setting range being set to a range of the steering angle before a collision occurs between a stopper of a rack-bar and an inner ball joint socket of a gear box set.

10. The apparatus for controlling a motor driven steering system of claim 9, wherein in setting the reference point of the motor angle, the control unit determines whether the steering angle sensor is failed or not after an ignition of a vehicle is on, and sets the reference point of the motor angle using one of a steering angle inputted from the steering angle sensor and a steering angle stored when the ignition of the vehicle is off, according to a result of determining whether the steering angle sensor is failed or not.

11. The apparatus for controlling a motor driven steering system of claim 10, wherein in setting the reference point of the motor angle, the control unit sets the reference point of the motor angle in response to the steering angle inputted from the steering angle sensor if the steering angle sensor is in a normal state, and the control unit sets the reference point of the motor angle using the steering angle stored when the ignition of the vehicle is off if the steering angle sensor is in a fail state.

12. The apparatus for controlling a motor driven steering system of claim 11, wherein in setting the reference point of the motor angle, the control unit sets the current steering angle to 0 if the vehicle is in the straight-running state, and the control unit determines whether an error between the current steering angle and the steering angle stored when the ignition of the vehicle is off is equal to or greater than a setting error, sets the reference point of the motor angle on the basis of the current steering angle if the error of the steering angle is determined to be equal to or greater than a setting error, and sets the reference point of the motor angle on the basis of the steering angle stored when the ignition of the vehicle is off if the error of the steering angle is determined to be less than the setting error.

13. The apparatus for controlling a motor driven steering system of claim 9, wherein in controlling the output torque of the motor driven steering system, the control unit detects a predetermined current decouple gain corresponding to the steering angular speed and the steering angle, and compensates the output torque of the motor driven steering system by reflecting the current decouple gain to the output torque of the motor driven steering system.

14. The apparatus for controlling a motor driven steering system of claim 9, wherein in controlling the output torque of the motor driven steering system, the control unit detects a predetermined vehicle speed gain corresponding to the speed of a vehicle, and compensates the output torque of the motor driven steering system by reflecting the vehicle speed gain to the output torque of the motor driven steering system.

* * * * *